United States Patent [19]

Gilliland

[11] Patent Number: 4,950,863
[45] Date of Patent: Aug. 21, 1990

[54] APPARATUS FOR AIR ARC GOUGING

[76] Inventor: Malcolm T. Gilliland, 310 Pine Valley Rd., Marietta, Ga. 30067

[21] Appl. No.: 468,468

[22] Filed: Jan. 22, 1990

[51] Int. Cl.$^5$ .............................................. B23K 9/013
[52] U.S. Cl. .................. 219/130.1; 219/69 R
[58] Field of Search .................. 219/130.1, 136, 69 R

[56] References Cited

U.S. PATENT DOCUMENTS

| | | | |
|---|---|---|---|
| 3,278,721 | 10/1966 | Roe ................................... | 219/130.1 |
| 4,117,304 | 9/1978 | Wodzinski et al. ............... | 219/130.1 |
| 4,251,710 | 2/1981 | Ortega-Aguivie et al. ...... | 219/130.1 |

*Primary Examiner*—Clifford C. Shaw
*Attorney, Agent, or Firm*—Jones, Askew & Lunsford

[57] ABSTRACT

An air arc gouger. A central power supply (10) and a welding station (11) are used for welding operations, such as welding two metal plates (30A, 30B) together. If a weld (30C) is required to be removed, an adapter circuit (12), in conjunction with the central power supply )10) and the welding station (11), are used. The adapter circuit (12) need only supply the difference between the current required to maintain the gouging arc (31) and the maximum continuous output current of the welding station (11). The adapter circuit (12) is. smaller, less expensive, lighter, more portable, and generates less heat than a conventional resistor grid.

6 Claims, 1 Drawing Sheet

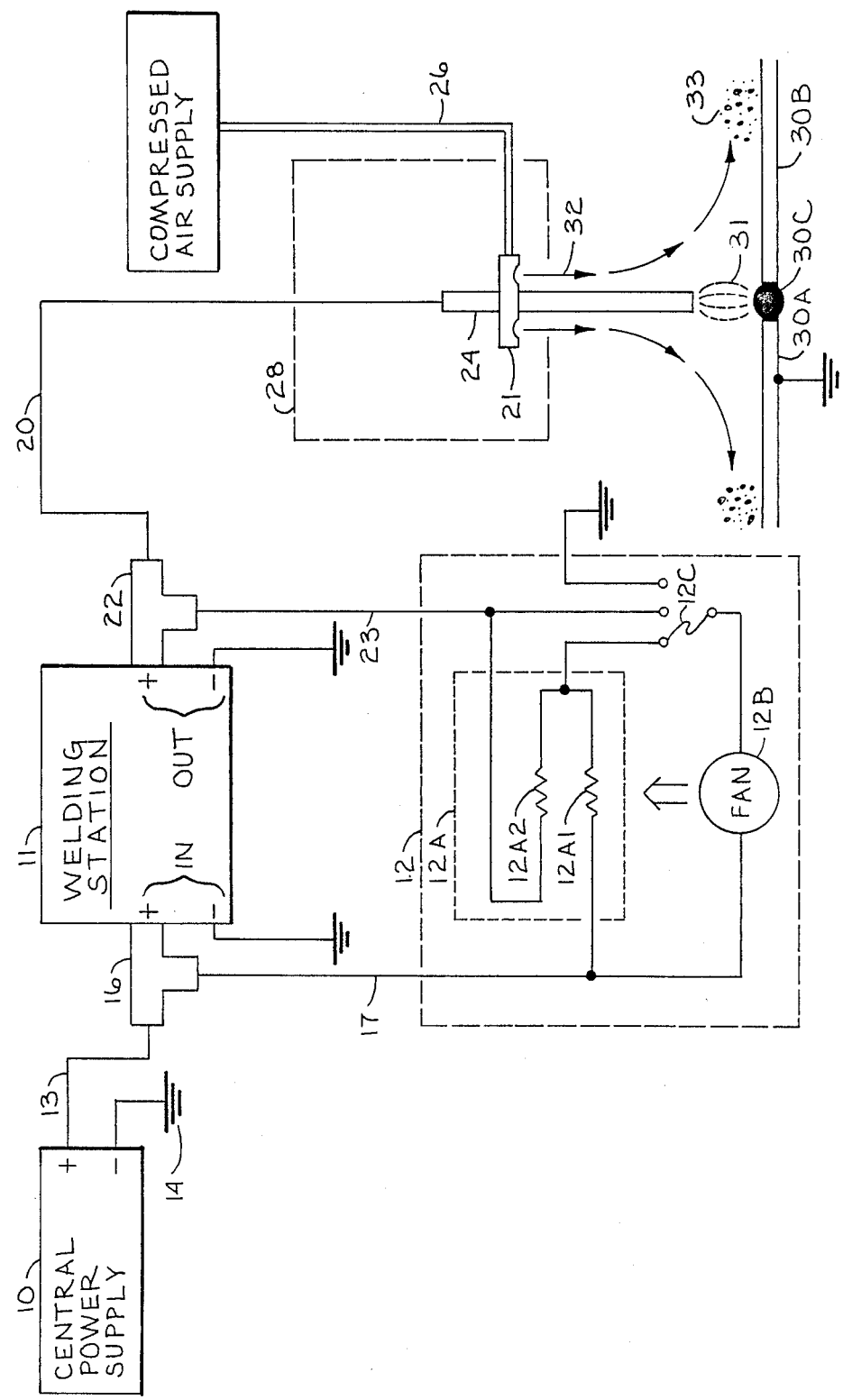

APPARATUS FOR AIR ARC GOUGING

TECHNICAL FIELD

The present invention relates to air arc gougers and, more particularly, to an adaptive circuit for converting a welding station to an air arc gouger.

BACKGROUND OF THE INVENTION

Air arc gouging is a process by which metal is removed. Air arc gouging is used mainly in conjucntion with repair work, such as to remove a bad weld, or finishing work, such as removing the welds off the back side of a joint. In this process, a copper-coated carbon rod is touched to the workpiece, such as a plate, to start an arc. The rod is then backed off slightly so that the rod does not touch the plate as long as the arc is maintained. The arc melts the selected portion of the plate, or the selected portion of the weld on the plate. The carbon rod is held by a gouging assembly, such as an air arc torch assembly, which allows compressed air to flow a high speed down the sides of the rod and blow the molten metal away from the melt area. The process therefore makes a hole if the gouging assembly is stationary or makes a trough if the gouging assembly moves.

The air is typically provided to the gouging assembly at a pressure of 60 to 100 psi. The gouging process requires approximately 460 amps at approximately 42 volts (arc voltage). Very little adjustment of the current or voltage is required.

In the past, a resistor grid has been used to provide the current for the air arc gouging process. The resistor grid contains a plurality of low resistance, high power resistors. The resistor grid works quite satisfactorily but has several disadvantages. The first disadvantage is that the resistor grid is quite large and heavy. This arises from the power that the resistor grid must dissipate. If an 80 volt power supply is used, the arc voltage is 42 volts, and the arc current is 460 amps, it can be quickly determined that the power dissipated by the resistor grid is approximately 17.5 kilowatts, thereby necessitating large resistors so that the resistors do not overheat and burn up. Because of the power dissipation, the resistor grid becomes quite hot and must cool before being moved between jobs. A typical resistor grid is 24 inches long by 12 inches high by 18 inches wide and weighs 65 to 70 pounds. From the size, weight and power dissipation of the resistor grid it will be readily appreciated that the resistor grid is not a conveniently portable device. In ship building and ship repair operations the resistor grid is typically placed outside, on the deck of the ship, and cables are run from the resistor grid to the point where the gouging operation is to be performed. The cables are run in addition to any cables which may be necessary to operate a welding station. When one gouging operation is completed the cables are retrieved and then routed through the ship to the next gouging operation. It will therefore be appreciated that a substantial number of man hours are used just in the process of routing and retrieving the cables and setting up for the gouging operation with the resistor grid. It would seem that the resistor grid could simply be moved to the area where the gouging operation is to be performed but, in practice, this is generally undesirable because of the size, weight, and heat dissipation of the resistor grid.

In addition to the resistor grid, gouging operations are sometimes performed with a high current welding station or power supply, such as a 600 amp STICK welding station or power supply. However, the STICK device also suffers from some of the same problems as the resistor grid: size, weight, and heat generation.

In addition to the problems enumerated above, these devices also suffer from the problems of cost and utility. Except for the gouging operation and pickup STICK welding or tacking the resistor grid essentially has no other utility and, because of the cost of the resistor grid, and the amount of space required to store the resistor grid when it is not being used, the number of resistor grids purchased is usually held to a minimum. However, this minimum number of resistor grids frequently means that one gouging operation, and the subsequent repair, must wait for the completion of the current gouging operation. This means that man hours are often wasted while the welding operator awaits the availability of a resistor grid for gouging.

In addition to the above shortcomings, the resistor grid is also inefficient. That is, because the arc voltage is only 42 volts whereas the power supply voltage is typically 80 volts, approximately one half of the output of the power supply is wasted as heat and is not used for the gouging operation. Also, because of the approximately 460 amp current requirement of a typical gouging operation, the cables between the resistor grid and the area in which the gouging is to be performed must be quite large, such as 3/0 or 4/0 cable.

Also, the resistor grid has a limited short circuit output current capability, typically less than 1000 amps. This limited current capability sometimes causes the rod to "stub out" and overheat the copper sheath if the rod is touched to the plate. In this case the rod should be broken off and the arc restarted to resume smooth gouging. To avoid this problem, two resistor grids are occasionally used in parallel to increase the output current capability and prevent "stubbing out".

Therefore, there is a need for an apparatus for air arc gouging which is lighter and smaller than a resistor grid or a STICK welding station.

Furthermore, there is a need for an apparatus for air arc gouging which is of a size and weight so as to be conveniently portable and which operates from an 80 volt supply.

Furthermore, there is a need for an apparatus for air arc gouging which minimizes the size and number of extra cables that must be run in order to perform a gouging operation.

Furthermore, there is a need for an apparatus for air arc gouging which is more efficient than a resistor grid.

Furthermore, there is a need for an apparatus for air arc gouging which has an output current capacity sufficient to prevent the rod from stubbing out.

Furthermore, there is a need for an apparatus for air arc gouging which is of a size, weight, cost, and electrical efficiency so as to make it economical and practical to obtain and maintain a larger number of these devices than the typical number of resistor grid devices.

SUMMARY OF THE INVENTION

The present invention is an apparatus which, when used in conjunction with a typical welding station, provides a device which has a capacity sufficient for air arc gouging operations.

More particularly, the present invention is an apparatus which supplements the current output of a welding station so that the combined current output of the welding station and the present invention is sufficient to accomplish air arc gouging.

The present invention uses a resistor circuit, connected in parallel with the welding station, to provide an increased output current. In addition, the present invention uses a fan so as to allow smaller resistors to be used in the resistor circiut. In the present invention, the welding station and the resistor circuit each contribute to the output current used for gouging. If one assumes that the welding station can provide approximately one half of the required current then the resistor circuit need only supply the other half of the gouging current. This means that the resistor circuit generates only one quarter of the heat of the resistor grid. Therefore, smaller, lighter weight resistors can be used for the resistor circuit than for the resistors in the resistor grid. In addition, in the present invention, a fan forces air across the resistor so as to further reduce the required size of the resistors.

The result is a small, lightweight, portable device which, when used in conjunction with a typical welding station, provides the capability to perform air arc gouging.

In addition, a typical electronic welding station is a more electrically efficient device than a resistor grid because an electronic welding station steps down the power supply voltage to the required arc voltage, rather than dropping the voltage across a resistor. Therefore, the present invention provides an apparatus for air arc gouging which is more efficient than a resistor grid.

In addition, the size and weight of the adapter circuit make it conveniently portable so that it can be brought to the area where the gouging operation is to be perfomed and use the cables that were previously provided for the operation of the welding station. Therefore, it is an advantage of the present invention that the number of cables is reduced.

The use of a fan for cooling a resistor circuit further reduces the size and cost of the required resistors. Therefore, it is another advantage of the present invention that the cost is substantially less than of a resistor grid.

The present invention uses an existing welding station to perform both welding operations and gouging operations so that the welding station has less non-productive time. Therefore, it is another advantage of the present invention that existing welding stations are used to perform both welding and gouging operations.

The present invention, an apparatus for air arc gouging, has a power supply, a welding station, an adapter circuit, means for connecting the power supply to the welding station and the adapter circuit, and means for connecting the output of the welding station and the output of the adapter circuit together to provide the required gouging current.

Furthermore, the combination of the welding station and the adapter circuit provide an output current capacity which is sufficient to prevent the rod from "stubbing out". Therefore, the need for a second resistor grid is eliminated.

That the present invention provides these and other advantages over the prior art will become apparent from the detailed description below.

BRIEF DESCRIPTION OF THE DRAWING

The FIGURE is a diagram of the preferred embodiment of the present invention.

DETAILED DESCRIPTION

The FIGURE is a diagram of the preferred embodiment of the present invention. A central power supply 10 provides operating power to a welding station 11 and an adapter circuit 12. When performing welding operations, power supply 10 will be connected directly to welding station 11 through a cable 13. The power return between power supply 10 and welding station 11 may be accomplished via another cable (not shown) but is more typically accomplished via connecting the power supply 10 and welding station 11 to a common metallic conductor, such as ship ground 14. When gouging operations are to be performed, a T adapter 16, such as Cam-Lock T adapter, is interposed between cable 13 and welding station 11, and an additional cable 17 is run between the T 16 and the adapter circuit 12. The preferred usage of the present invention contemplates that the adapter circuit 12 will be in close proximity to the welding station 11 and therefore cable 17 will be of nominal length, typically one to three feet. Cable 17 may be a discrete cable or may be provided as part of adapter circuit 12. Welding station 11 is a conventional electronic welding station which has a nominal continuous output current capability of 220 amps. In the preferred embodiment, welding station 11 is a weld selector station such as that described in U.S. Pat. Nos. 4,716,274, 4,870,248, and 4,896,018, issued to Malcolm T. Gilliland. The disclosures of these patents are hereby fully incorporated herein by reference.

For welding operations, the output of welding station 11 is connected by cable 20 to a welding torch and feeder assembly (not shown). However, for gouging operations, the welding torch and feeder assembly is replaced by a gouging assembly 28, such as the above-mentioned arc air torch assembly. Also, another T 22 is interposed between the output of welding station 11 and cable 20. Cable 23 then connects the output of adapter circuit 12 to the T 22. Cable 23, like cable 17, is a short cable (1-3 feet) and may be a discrete cable or a part of adapter circuit 12. When gouging operations are being performed, a copper-coated, carbon rod 24 is inserted into the rod holder 21 of assembly 28. In addition, rod holder 21, which typically has at least two holes or nozzles for blowing air 32, is connected to a compressed air supply 27 via an air hose 26. Rod holder 21 causes air 32 to be forced alongside of rod 24.

During gouging operations rod 24 is struck against the plate 30A, 30B, or the existing weld 30C. This causes an arc 31 to be struck which melts the weld 30C. The compressed air 32 blowing out of assembly 28 blows the molten metal 33 away from the weld 30C. Depending upon the speed of travel across the plate 30 the remainder of weld 30C may be smooth, recessed below the surface of plate 30, or completely eradicated. The arc voltage and arc current required for a gouging operation is typically 42 volts and 460 amps.

As previously stated, in the preferred embodiment welding station 11 has a nominal continuous output current rating of 220 amps. Therefore, adapter circuit 12 provides the remaining 240 amps of current required for conducting gouging operations. Adapter circuit 12 has a resistor circuit 12A and a fan 12B. Three different embodiments are shown by virtue of jumper 12C. In the preferred embodiment, resistor circuit 12A comprises a first resistor 12A1 connected in series with a second resistor 12A2. These resistors are equal and each have a value of 0.07 ohms. One end of resistor circuit 12A is connected to cable 17 and the other end is connected to cable 23. Fan 12B is connected in parallel with one of the resistors, such as resitor 12A1. In this embodiment, fan 12B is a 12 volt fan. The voltage across resistor string 12A is nominally 38 volts so approximately 19 volts will be provided to fan 12B. This is above the nominal operating voltage of fan 12B but causes no problems. Fan 12B has a nominal capacity of 450 cubic feet per minute.

In an alternative embodiment fan 12B is connected in parallel with resistor circuit 12A. Therefore, in this embodiment fan 12B has a nominal voltage rating of 38 volts. Also, in this embodiment, resistor circuit 12A may consist of a single resistor 12A1 rather than two resistors 12A1 and 12B2.

It will be noted that in the preferred embodiment and the above alternative embodiment fan 12B is only powered when arc 31 has been struck and the gouging operation is being performed. However, so as to facilitate cooling of resistor circuit 12A between gouging operations, fan 12B may be connected between cable 17 and ship ground 14. In this case fan 12B runs continuously and should be rated at approximately 80 volts.

The efficiency of the combination of welding station 11 and adapter circuit 12 exceeds that of a resistor grid. This arises because welding station 11 steps down the nominal 80 volt output of power supply 10 to the approximately 42 volts of arc 31. Because the output current of welding station 11 is approximately 220 amps the input current to welding station 11 will be stepped down to approximately 110 amps. Adapter circuit 12 provides the other 240 amps required for the gouging operation so that the total current drawn from power supply is approximately 350 amps, as compared with the 460 amps required by a resistor grid. Also, the reduced current drained from power supply 10 allows the use of smaller cables, such as 2/0 rather than 3/0 or 4/0. This lighter cable is also less expensive and easier to move. Furthermore, this single cable is adequate for both welding and gouging operations. Therefore, the requirement of a separate heavy duty cable to perform gouging operations, as with the resistor grid, is eliminated by the use of an adapter circuit 12 in conjunction with a welding station 11.

Because adapter circuit 12 need only make up the difference between the current required by arc 31 and the current provided by welding station 11 the resistors used in resistor circuit 12A can be physically smaller, fewer in number, and have less power dissipation than resistors required in a resistor grid. As a consequence, adapter circuit 12, is substantially smaller than a resistor grid and, in the preferred embodiment, is 8" high×8" wide×11" long and weighs approximately 22 pounds. Therefore, adapter 12 occupies approximately one sixth of the volume of a resistor grid and weighs approximately one third of the weight of a resistor grid. The reduction in size weight of adapter 12, as compared with a resistor grid, will allow adapter 12 to be conveniently carried from area to area.

When using the welding station 11 described in the above referenced patents, welding station 11 should be set to the maximum STICK setting, the high/low voltage switch over threshold setting (used for arc starting) should be set at 50 to 55 volts, and only one of the series resistors in the output stage of the welding station should be used. If a different type of welding station is used, then the welding station should be set to provide approximately 220 amps continuous, non-pulsed output current.

The welding station described in the above patents has a high instantaneous current capability, approximately 2,000 amps for several milliseconds. This high instantaneous current capability provides the higher peak currents required to prevent rod 24 from stubbing out when rod 24 is touched to the plate 30, which occurs when the arc 31 is being started and also sometimes occurs, generally inadvertently, when the rod 24 is being moved along the length of the weld 30C. Furthermore, when rod 24 is touched to plate 30, resistor circuit 12A will provide an additional 570 amps (80 volts/0.14 ohms), thus yielding a total instantaneous current in excess of 2,500 amps.

However, a conventional grid resistor, having a value of approximately 0.08 ohms, will only provide an instantaneous current of 1,000 amps when rod 24 is touched to plated 30. It will therefore be seen that the combination of welding station 11 and adapter circuit 12 provide a substantially higher peak current than a conventional resistor grid. As previously stated, a high peak current is required for starting the arc and for maintaining the arc and for preventing rod 24 from stubbing out when rod 24 is inadvertently touched to plate 30.

From the above, it will be appreciated that the present invention provides an adapter circuit which, used in conjunction with a welding station, provides an apparatus for air arc gouging which is smaller, lighter weight, lower cost, more portable, and generates less heat than a conventional resistor grid. Although the preferred embodiment has been described with particularity it will be appreciated that other embodiments will become apparent from a reading of the detailed description above. Therefore, the scope of the present invention is to be limited only by the claims below.

I claim:

1. An apparatus for providing gouging current to a gouging assembly for air arc gouging, comprising:
    a power supply;
    a welding station having a first output point for providing a first output current, said first output current having an average value which is less than a first predetermined average current value;
    an adapter circuit having a second output point for providing a second output current, said second output current having an average value which is less than a second predetermined average current value;
    means for connecting said power supply to said welding station and said adapter circuit; and
    means for connecting said first output point and said second output point to said gouging assembly;
    said adapter circuit comprising a resistor circuit connected between said power supply and said second output point and a fan for cooling said resistor circuit;
    wherein said gouging current is the sum of said first output current and said second output current.

2. The apparatus of claim 1 wherein said resistor circuit comprises the series combination of a first resistor and a second resistor, and said fan is conneccted in parallel with a predetermined one of said first resistor and said second resistor.

3. The apparatus of claim 2 wherein said first resistor and said second resistor have substantially equal resistance values.

4. The apparatus of claim 1 wherein said fan is connected in parallel with said resistor circuit.

5. The apparatus of claim 1 wherein said welding station provides an arc starting current substantially in excess of said first predetermined average current value.

6. The apparatus of claim 1 wherein said fan provides air for cooling said resistor circuit at a rate which is slightly more than that required to prevent said resistor circuit from overheating when said second output current has a value approximately equal to said second predetermined average current value.

* * * * *